United States Patent
Oroskar et al.

(10) Patent No.: US 11,382,043 B1
(45) Date of Patent: Jul. 5, 2022

(54) METHODS AND SYSTEMS FOR SELECTING COORDINATED MULTIPOINT ENHANCEMENT MODE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 915 days.

(21) Appl. No.: 15/432,843

(22) Filed: Feb. 14, 2017

(51) Int. Cl.
*H04W 52/02* (2009.01)
*H04W 8/22* (2009.01)
*H04L 1/00* (2006.01)
*H04B 7/024* (2017.01)

(52) U.S. Cl.
CPC ........ *H04W 52/0261* (2013.01); *H04B 7/024* (2013.01); *H04L 1/0003* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 8,958,345 B2 | 2/2015 | Rath et al. | |
| 8,989,125 B1* | 3/2015 | Marupaduga | H04B 7/024 370/329 |
| 9,143,972 B2 | 9/2015 | Tao et al. | |
| 2012/0184322 A1 | 7/2012 | Falconetti et al. | |
| 2013/0025884 A1 | 1/2013 | Xu et al. | |
| 2013/0040675 A1* | 2/2013 | Ant | H04W 52/226 455/509 |
| 2015/0049626 A1 | 2/2015 | Chen et al. | |
| 2015/0092893 A1 | 4/2015 | Tabet et al. | |
| 2015/0341149 A1 | 11/2015 | Chatterjee et al. | |

OTHER PUBLICATIONS

3GPP, 3rd Generation Partnership Project; Technical Specification Group Radio Access Network; Public safety broadband high power User Equipment for band 14, vol. 11, Dec. 2012, <http://www.3gpp.org>.

Hsu et al., "Dynamic Cooperating Set Planning for Coordinated Multi-Point (CoMP) in LTE/LTE-Advanced Systems", Dec. 2, 2013, IEEE.

* cited by examiner

*Primary Examiner* — Yemane Mesfin
*Assistant Examiner* — Jeff Banthrongsack (57) ABSTRACT

Methods and systems are disclosed that can help to select an enhancement mode for uplink coordinated multipoint (CoMP). An exemplary method involves: determining a measure of remaining battery power of a first user equipment (UE), wherein the first UE is capable of uplink coordinated multipoint (CoMP) communication; determining a particular UE type of the first UE, wherein the particular UE type is one of a plurality of possible UE types; based at least in part on (a) the particular UE type of the first UE, and (b) the measure of remaining battery power of the first UE, selecting either a battery-saving mode or a throughput-enhancement mode as an uplink CoMP enhancement mode for the first UE; and providing uplink CoMP service to the first UE according to the selected uplink CoMP enhancement mode.

20 Claims, 6 Drawing Sheets

METHODS AND SYSTEMS FOR SELECTING COORDINATED MULTIPOINT ENHANCEMENT MODE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In a further aspect, Release 11 of the LTE standard proposed a new type of UE, referred to as a "High Power User Equipment" (HPUE), to operate on E-UTRA band 14 (700 MHz), which is allocated for public safety by the U.S. government. According to the proposal, the maximum output power for uplink transmissions by a "standard" UE is 23 dBm, whereas the maximum output power for uplink transmissions by an HPUE is 31 dBm. 3GPP introduced HPUEs in order to extend the range of public safety transmissions; e.g., in rural areas.

In another aspect, reception at cell edges of OFDMA networks, such as LTE networks, may be problematic for various reasons. For example, the greater distance to a base station at a cell edge may result in lower signal strength. Further, at a cell edge, interference levels from neighboring cells are likely to be higher, as the wireless communication device is generally closer to neighboring cells when at a cell edge.

In an effort to improve the quality of service at cell edges, 3GPP LTE-A Release 11 introduced a number of Coordinated Multipoint (CoMP) schemes. By implementing such CoMP schemes, a cooperating set of cells may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, two basic types of CoMP modes are set forth: joint processing (JP) schemes and coordinated scheduling/beamforming (CSCH or DL-CSCH) schemes. For the uplink, numerous types of CoMP modes have been devised.

Some uplink CoMP modes may involve "joint reception" and/or "joint processing." Joint reception generally involves multiple cells receiving an uplink signal that is transmitted by a given UE. Uplink CoMP modes may involve interference rejection combining (IRC) or coordinated scheduling for purposes of reducing or preventing interference between transmissions from different user devices. When cells in a cooperating set are served by different base stations (e.g., inter-eNodeB CoMP), joint processing can involve the multiple base stations that received the uplink signal from the UE, sending the respectively received signals or a decoded and/or processed version of the respectively received signals to one another, or just to a base station of the serving cell in the group. In both intra- and inter-eNodeB CoMP, combination of the multiple received versions of a UE's transmissions on physical uplink shared channel (PUSCH) can provide uplink gain; thereby improving reception and/or reduce interference.

OVERVIEW

In some CoMP implementations, network settings may be used to adjust the way in which the benefits of CoMP are realized by end users. In particular, different enhancement modes may be used to effect the way in which the uplink gain provided by joint reception on the physical uplink shared channel (PUSCH) are utilized. As an example, an eNodeB may adjust an enhancement-mode setting so as to switch between a battery-saving mode and a throughput-enhancement mode. In the battery-saving mode, the gain provided by uplink CoMP is utilized to allow a UE to reduce its transmission power, which can potentially reduce the amount of power the UE utilizes for a given transmission. When the throughput-enhancement mode is selected, the gain provided by uplink CoMP (e.g., by joint reception) is utilized to enhance the uplink throughput of the UE.

Exemplary embodiments can be implemented to dynamically select the uplink CoMP enhancement mode for a given UE based upon one or more of various factors. For example, it may be desirable to increase the throughput of HPUEs designated for public safety communications by utilizing the uplink CoMP throughput-enhancement mode. Further, to the extent other types of HPUEs (e.g., not designated for public safety) become available, such UEs may also benefit from throughput enhancement.

Another factor that can affect selection of an uplink CoMP enhancement mode is a UE's remaining battery power. In some cases, where a UE's battery power is low, it may be desirable for the UE to be provided with power saving benefits of uplink CoMP using the battery-saving mode. However, in the case of HPUEs, battery-saving mode may not provide the intended power saving benefits, and thus may not be desirable, even when an HPUE's battery power is low.

More specifically, given that an HPUE's maximum transmission power is significantly higher than that of a non-HPUE, the HPUE may be capable of uplink transmissions at higher throughput rate than a non-HPUE. As such, an HPUE can complete the transmission of a given size in less time than a non-HPUE can complete a transmission of the same size, which results in the HPUE's transmitter (and possibly other components) powering on for less time. In some cases, by transmitting at a higher power for a shorter period of time, an HPUE may consume less power for a given transmission, than it would if it were to transmit the same amount of data at a lower power level over a longer period of time (e.g., with a lower throughput rate). Accordingly, exemplary embodiments may allow eNodeBs to select the throughput-enhancement mode for uplink CoMP with an HPUE, and to evaluate the remaining battery power of a non-HPUE to determine whether to provide non-HPUEs uplink CoMP using the battery-saving mode or throughput-enhancement mode.

More generally, in one aspect, an exemplary method involves: (i) determining a measure of remaining battery power of a first UE, where the first UE is capable of uplink CoMP; (ii) determining a particular UE type of the first UE, wherein the particular UE type is one of a plurality of possible UE types; (iii) based at least in part on (a) the particular UE type of the first UE, and (b) the measure of remaining battery power of the first UE, selecting either a battery-saving mode or a throughput-enhancement mode as an uplink CoMP enhancement mode for the first UE; and (iv) providing uplink CoMP service to the first UE according to the selected uplink CoMP enhancement mode.

In another aspect, an exemplary network system includes a communication interface operable for cellular communications with at least one UE, at least one processor, and, program instructions stored in a non-transitory computer readable medium. The program instructions are executable by at least one processor to: (a) determine a measure of remaining battery power of a first UE, wherein the first UE is capable of uplink CoMP communication via the radio access network; (b) determine a particular UE type of the first UE, wherein the particular UE type is one of a plurality of possible UE types; (c) based at least in part on (i) the particular UE type of the first UE, and (ii) the measure of remaining battery power of the first UE, select either a battery-saving mode or a throughput-enhancement mode as an uplink CoMP enhancement mode for the first UE; and (d) provide uplink CoMP service to the first UE according to the selected uplink CoMP enhancement mode.

In a further aspect, another exemplary method involves: (i) determining whether a first UE is of a first UE type or a second UE type; (ii) when the first UE is determined to be of the first UE type, selecting a throughput-enhancement mode as an uplink coordinated multipoint (CoMP) enhancement mode for the first UE; and (iii) when the first UE is not determined to be an HPUE, then (a) determining a measure of remaining battery power of the first UE; (b) comparing the measure of the remaining battery power to a predetermined threshold; (c) when the comparison indicates that the remaining battery power of the first UE is less than the predetermined threshold, selecting a battery-saving mode as the uplink CoMP enhancement mode for the first UE; and (d) when the comparison indicates that the remaining battery power of the first UE is greater than or equal to the predetermined threshold, then selecting the throughput-enhancement mode as the uplink CoMP enhancement mode for the first UE.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. EXEMPLARY NETWORK ARCHITECTURE

Figure 1A:
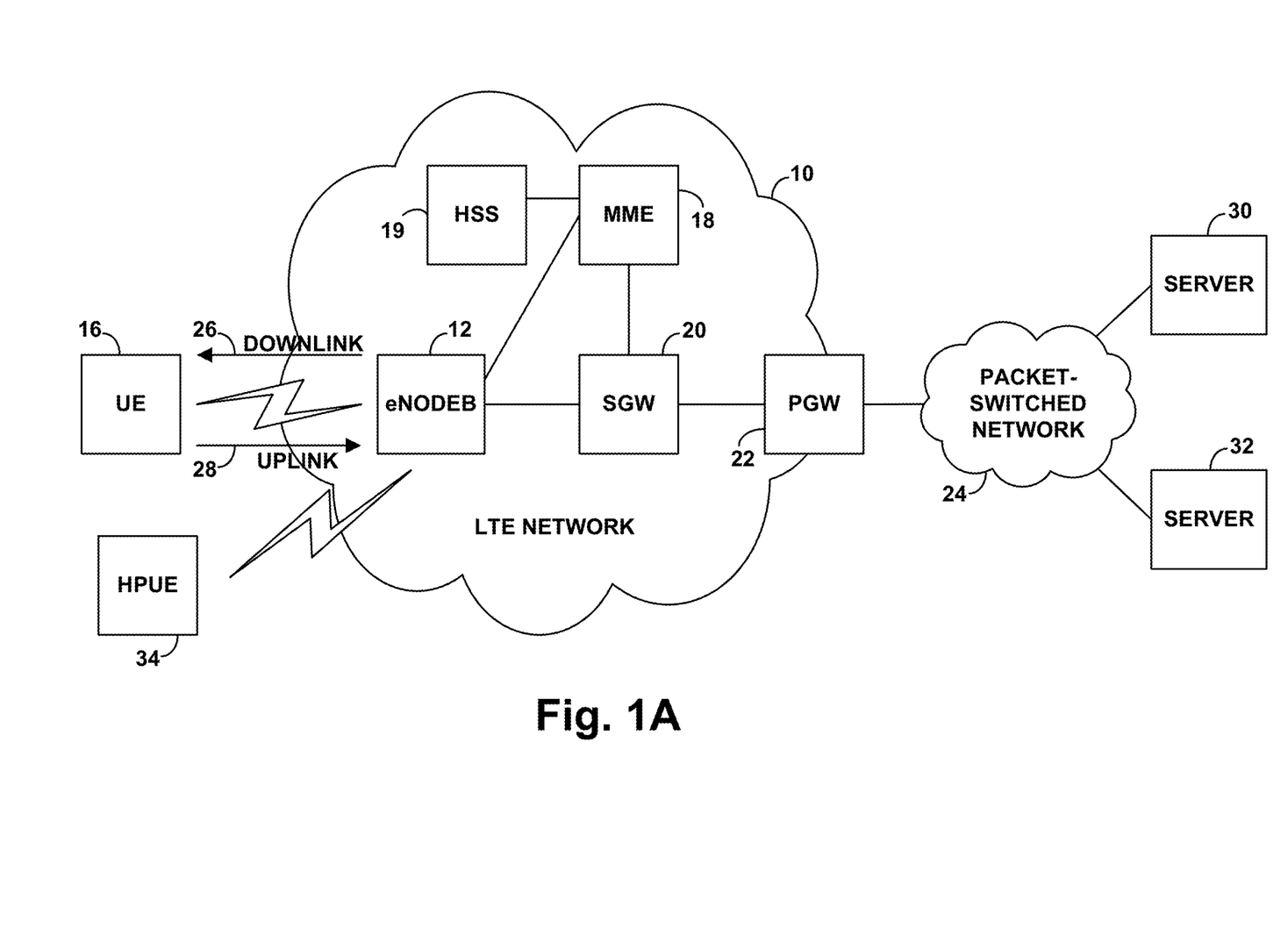
FIG. 1A is a simplified block diagram of a wireless communication system in which the present method and system can be implemented.

Referring to the drawings, FIG. 1A is a simplified block diagram of a wireless communication system in which the present method and system can be implemented. In particular, FIG. 1A depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas (e.g., cells) in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-switched network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given cell served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

II. HIGH POWER USER EQUIPMENT

FIG. 1A also shows a UE that is classified as a High Power User Equipment (HPUE) 34. While not shown in FIG. 1A, an HPUE 34 may engage in uplink and/or downlink communications with eNodeB 12 in a similar manner as UE 16. However, as noted above, Release 11 of the LTE standard specifies that an HPUE 34, which operates on E-UTRA band 14 (700 MHz), can have a maximum output power for uplink transmissions of 31 dBm, whereas the maximum output power for uplink transmissions by a non-HPUE (e.g., UE 16) is 23 dBm. Further, subsequent releases of the LTE standard by 3GPP specify power classes for UEs. HPUEs are classified in power class 1, while standard UEs in power class 3.

As further noted above, 3GPP introduced HPUEs in order to extend the range of public safety transmissions; e.g., in rural areas. However, it should be understood that the embodiments described herein that relate to or involve an HPUE are not limited to public safety communications and/or devices designated for use related to public safety. It is contemplated that other types of UEs, such as tablets and/or laptop computers, could be configured as HPUEs.

Further, it is possible that a UE may be classified as an HPUE on a permanent basis, or on a temporary basis. For example, in some embodiments, a service provider may allow any device that is plugged in (e.g., a tablet or mobile phone that is currently connected to an external power source, such as an electrical outlet) to be designated as an HPUE for purposes of exemplary methods, while the device is plugged in. Such device may or may not be designated as an HPUE when it is removed from an external power source. Other factors may also be utilized to temporarily designate a UE as an HPUE.

In another aspect, since the maximum transmission power of an HPUE is significantly higher than that of a non-HPUE, the HPUE may be capable of uplink transmissions at higher throughput rate than a non-HPUE. When transmitting with a higher transmission power, a UE can consume power at a higher rate than when transmitting with a comparatively lower transmission power. However, the higher throughput rate resulting from an HPUE's increased transmission power can reduce the amount of time it takes to complete a transmission of a given size, and thus the amount of time for which an HPUE's transmitter (and possibly other components) are consuming power for the given transmission. As a result, scenarios exist where despite consuming power at a higher rate, an HPUE will consume less power over the course of an entire transmission, because it takes less time for the HPUE to complete the transmission.

In another aspect, since the range of a UE's transmissions vary according to transmit power, an HPUE may have a significantly greater transmission range than a UE (e.g., 8 km as opposed to 4 km) with a lower maximum output power. Thus, an HPUE's uplink transmissions can potentially reach more eNodeBs from a given location, than a standard UE's uplink transmissions. Accordingly, when uplink CoMP service is provided, an HPUE can potentially have more eNodeBs in its cooperating set than a standard eNodeB transmitting from the same location.

It should be understand that for purposes of exemplary methods and systems described herein, HPUEs are not required to have a maximum output power for uplink transmissions of 31 dBm, and non-HPUEs are not required to have a maximum output power for uplink transmissions of 23 dBm. Generally, whenever one class or type of UE has a maximum output power for uplink transmissions that is higher than the maximum output power for another class or type of UE, the class or type of UE having the higher maximum output power may be classified as an HPUE, while the class or type of UE having the lower maximum output power may be classified as a non-HPUE (or not classified as an HPUE, without any other specific classification).

III. COORDINATED MULTIPOINT

As noted above, a network such as communication network 10 may implement various types of coordinated multipoint (CoMP) service, through which base stations (e.g., eNodeBs) may coordinate to improve uplink and/or downlink service. As noted above, CoMP schemes designed for coordinated transmission by base stations may be referred to as downlink CoMP modes, while CoMP schemes designed for coordinated reception may be referred to as uplink CoMP modes.

Figure 1B:
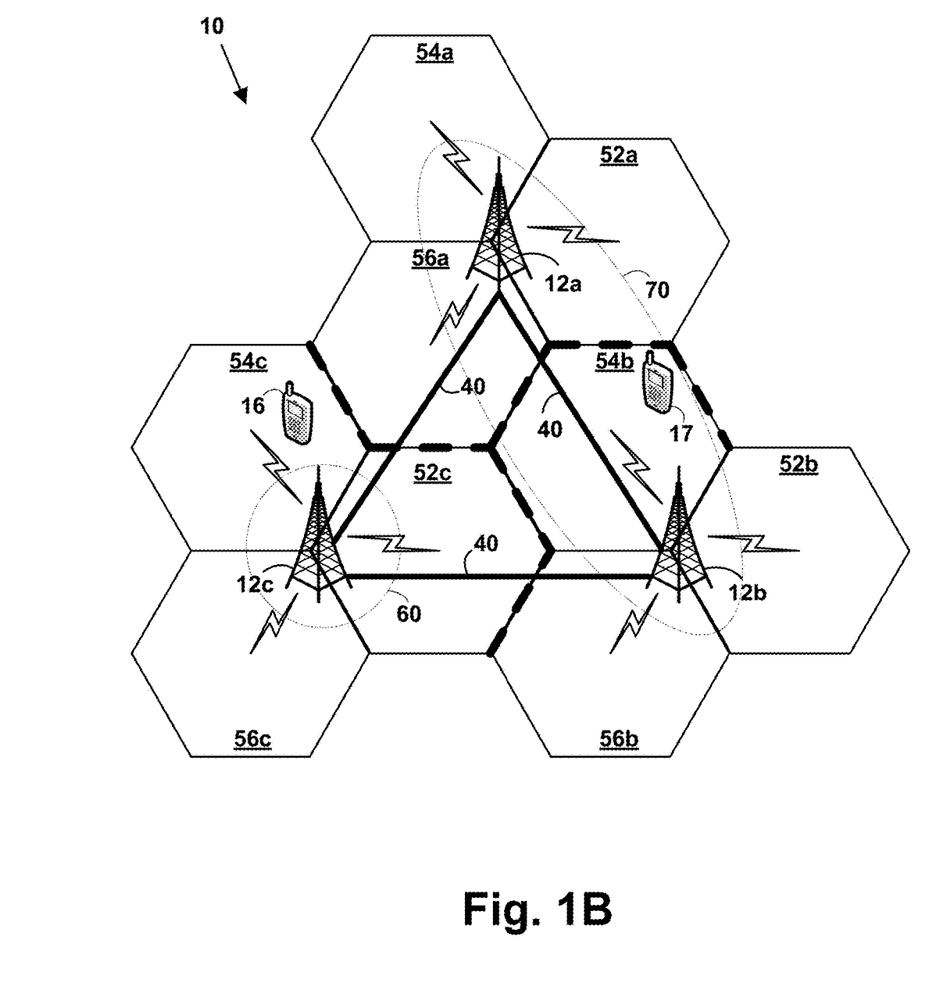
FIG. 1B is a simplified block diagram illustrating a portion of communication network in which coordinated multipoint may be implemented for uplink and/or downlink communications, according to exemplary embodiments.

FIG. 1B is a simplified block diagram illustrating a portion of communication network 10 in which CoMP schemes may be implemented for uplink and/or downlink communications. In particular, FIG. 1B shows a portion of an LTE network, which includes three eNodeBs 12a to 12c. More or less eNodeBs, and/or other types of access points or base transceiver stations, are also possible.

As shown, eNodeB 12a is serving three coverage areas or cells 52a, 54a, and 56a, eNodeB 12b is serving three coverage areas or cells 52b, 54b, and 56b, and eNodeB 12c is serving three coverage areas or cells 52c, 54c, and 56c. Further, a UE 16 is operating in cell 54c, which is served by eNodeB12c. Further, while not shown in FIG. 1B, each eNodeB 12a to 12c may be configured in the same or in a similar manner as the eNodeB 12 shown in FIG. 1A. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, uplink CoMP may be implemented by a single base station, which provides service in multiple cells. This type of CoMP scheme may be referred to as an "intra base station" or "intra-eNodeB" CoMP scheme. For example, eNodeB 12c may provide uplink CoMP by utilizing and/or combining uplink signals from a UE that are received at two or more of the cells 52c, 54c, and 56c that are served by eNodeB 12c. In particular, eNodeB 12c may define a CoMP coordinating set 60 for a UE to include all its cells 52c, 54c, and 56c. As such, eNodeB 12c may adaptively use joint processing techniques and/or interference rejection combining (IRC) techniques when the uplink signal from UE 16 is received at two or more of the cells 52c, 54c, and 56c that it serves.

In other cases, uplink CoMP may be implemented by multiple base stations, which may each provide service in multiple cells or only in one cell. This type of CoMP scheme may be referred to as an "inter base station" or "inter-eNodeB" CoMP scheme. For example, eNodeBs 12a and 12c may provide uplink CoMP by utilizing and/or combining uplink signals from an HPUE 17 that are received at two or more of the cells 52a, 54a, 56a, 52b, 54b, and 56b that are served by eNodeBs 12a and 12b. (Those skilled in the art will understand that in the context of CoMP the "uplink signals" received at different base stations result from the same uplink signal that is transmitted by the UE, but are different because the transmission is "perceived" differently in the different cells.)

When uplink CoMP involves multiple base stations (e.g., inter-base station CoMP), the base stations may coordinate with one another via a backhaul network, which allows for communications between base stations and/or other network components. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 1B, eNodeBs 12a to 12c are communicatively connected via X2 links 40. It should be understood, however, that other types of backhaul communications are also possible.

The set of cells that cooperate to provide uplink CoMP to a given UE may be referred to herein as the UE's "cooperating set" for uplink CoMP. The cooperating set may thus include a "serving cell" and one or more other "cooperating cell(s)". In practice, the eNodeB for the serving cell in a UE's CoMP cooperating set (or another network entity) may determine the other cell or cells that coordinate to provide uplink CoMP for a given UE, at a given point in time. More specifically, in some implementations, selection of cells for the cooperating set may be determined from cells listed in a "measurement set", for which the UE measures and reports signal strength and/or other channel state information. Additionally or alternatively, selection of eNodeBs for the cooperating set may be based on various factors, including, but not limited to, whether or not a signal from the given UE is received in a candidate cell, signal strength measurements, other indicators of air interface conditions, and/or processing load at eNodeBs serving cells in the measurement set, among other possibilities.

Uplink CoMP service can involve joint reception of the UE's uplink signal in two or more cells in a UE's cooperating set. The data transmitted on the PUSCH by a given UE may therefore be received by each eNodeB in the UE's cooperating set. The PUSCHs received in the different cells in each frame can then combined using various joint processing techniques, such as a mean squared error (MMSE) or zero forcing (ZF) process, among other possibilities. Further, joint reception and joint processing may be combined with other types of uplink CoMP techniques, such as interference rejection combining (IRC), adaptive antennas, and/or multi-user detection schemes, in an effort to further improve performance and/or for other reasons.

In some implementations, joint processing involves the eNodeB of each cooperating cell sending the eNodeB of the serving cell the received uplink signal via an X2 interface, without having decoded the received signal. Specifically, eNodeB(s) for the cooperating cell(s) may send raw I/Q data to the eNodeB for the serving cell via X2 interface(s) between these eNodeBs. The raw I/Q data may include all the physical layer bits received by the eNodeB.

In other implementations, joint processing may involve the eNodeB for each cooperating cell decoding a received signal before sending it to the eNodeB for the serving cell. For example, the decoding process may involve the eNodeB for each coordinating cell extracting user data (e.g., packet data) from the physical layer bits in the received uplink signal, such as by removing phase information represented by I/Q bits in the received signal, and/or removing other non-user data from the received signal, before coordinating with the eNodeB for the serving cell. The serving-cell eNodeB may then compare the decoded signal received from the coordinating cells to the decoded signal from the serving cell, and select the best decoded signal. Alternatively, the decoded signal received in the serving cell can be combined with the decoded signals from the cooperating cells in each frame, in order to generate a combined signal for the particular UE.

IV. ENHANCEMENT MODES FOR UPLINK COMP

As noted above, uplink CoMP schemes, such as those that involve joint reception, can provide gain in the uplink by combining a given UE's PUSCH transmissions received in multiple cells. The uplink gain provided in the PUSCH SINR can help to improve the quality of service and/or throughput provided to a UE 16 and/or HPUE 34, particularly in cell edges. According to some implementations of uplink CoMP, the network (e.g., an eNodeB) can switch between different enhancement modes, which vary the way in which the gain in the PUSCH SINR is utilized.

In an exemplary embodiment, a network may be configured to switch between two uplink CoMP enhancement modes: a battery-saving mode and a throughput-enhancement mode. When uplink CoMP service is provided according to battery-saving mode, the gain provided by uplink CoMP (e.g., by joint reception) is utilized to allow the UE to reduce its transmission power, which in turn can reduce the amount of power a UE utilizes for a given transmission. When uplink CoMP service is provided according to the throughput-enhancement mode, the gain provided by uplink CoMP (e.g., by joint reception) is utilized to enhance the uplink throughput of the UE.

Note that when uplink CoMP service is provided according to the throughput-enhancement mode, a UE may be permitted to transmit with a higher transmission power than it otherwise might. The higher transmission power will typically result in the UE's transmission range increasing, which can potentially increase the number of cells in which the UE's uplink transmissions can be received. Thus, in addition to improving gains from joint reception in a given cooperating set (e.g., in same set of cells that would provide uplink CoMP to a UE in the battery-saving mode), the throughput-enhancement mode can, in some scenarios, increase the number of cells that that receive the PUSCH (e.g., increase the size of the UE's cooperating set). This increase in the number of cells providing diversity reception can further enhance uplink throughput and/or quality of service gains from uplink CoMP. For instance, in the scenario illustrated in FIG. 1B, UE 17 (which could be an HPUE or non-HPUE) may have a larger cooperating set 70 due to an extended transmission range as the result of uplink CoMP service according to the throughput-enhancement mode, whereas UE 16 may have a lesser transmission range and a smaller cooperating set 60, as the result of uplink CoMP service according to the battery-saving mode.

In practice, the uplink CoMP enhancement mode may be implemented by way of selecting and assigning different modulation and coding schemes (MCSs) to a UE. For instance, when the throughput-enhancement mode is utilized to provide uplink CoMP for a given UE, an eNodeB may select a MCS that is designated for the throughput-enhancement mode (e.g., an MCS providing for 64-QAM). Similarly, when the battery-saving mode is utilized to provide uplink CoMP for a given UE, an eNodeB may select a MCS that is designated for the battery-saving mode (e.g., an MCS providing for 16-QAM).

V. EXEMPLARY NETWORK COMPONENTS

Figure 2:
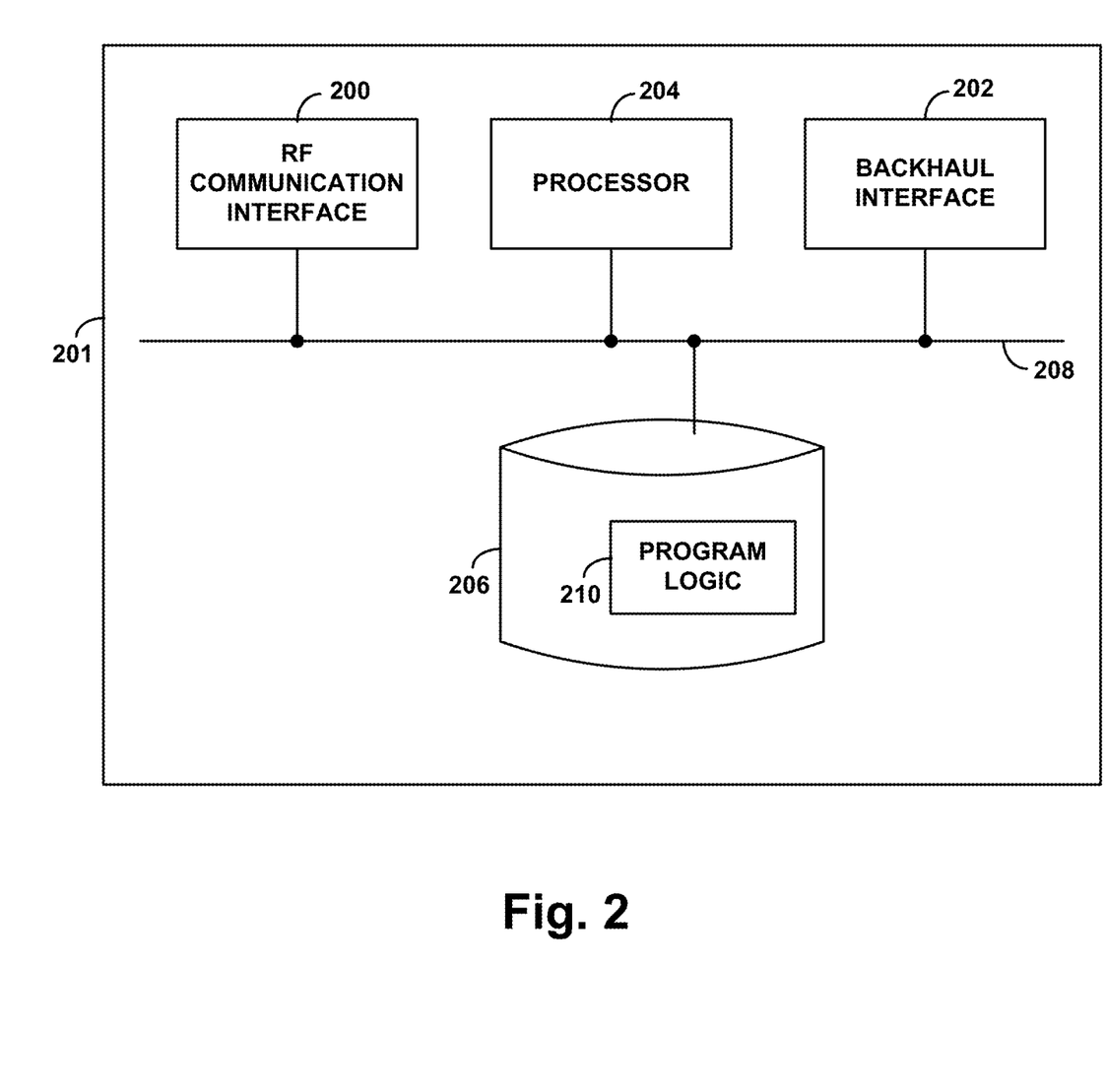
FIG. 2 is a simplified block diagram illustrating a network component, according to an exemplary embodiment.

FIG. 2 is a simplified block diagram illustrating a network component, according to an exemplary embodiment. In particular, FIG. 2 illustrates functional components that might be found in a network component 201 that is arranged to operate in accordance with the embodiments herein. As shown, the network component 201 may include a communication interface 200, a backhaul interface 202, a processor 204, and data storage 206, all of which may be communicatively linked together by a system bus 208, network, and/or one or more other connection mechanisms.

In practice, network component 201 may take the form of an eNodeB, or may take the form of another component of an LTE or CDMA network. Further, the illustrated components of network component 201 (e.g., communication interface 200, a backhaul interface 202, a processor 204, and/or data storage 206) may be distributed and/or subdivided between one or more entities in an LTE network and/or in a CDMA network. It should be understood that an exemplary system may also take the form of another network entity or combinations of other network entities, without departing from the scope of the invention.

In network component 201, communication interface 200 may comprise one or more or wired or wireless communication interfaces and/or other associated equipment for engaging in communications with other network entities and/or for engaging in RF communications with mobile stations according to one or more air interface protocols. Chipsets, antennas, and/or other components for such RF communications are readily available and well known to those skilled in the art. Backhaul interface 202 may comprise any sort of communication link or mechanism enabling the network component 201 to exchange signaling and bearer data with other network entities, such as an X2 link, for instance. Further, processor 204 may comprise one or more processors (e.g., general purpose and/or special purpose processors), such as microprocessors for instance. Chipsets, ports, and/or other components for such backhaul communications are readily available and well known to those skilled in the art.

Data storage 206 may be a non-transitory computer readable medium. For example, data storage 206 may take the form of one or more volatile and/or non-volatile storage components, such as magnetic, optical, or organic storage components, integrated in whole or in part with processor 204. As further shown, data storage 206 contains program logic 210 (e.g., machine language instructions) executable by processor 204 to carry out various functions, such as the functionality of the exemplary methods and systems described herein.

In an exemplary embodiment, communication interfaces 200 may include an RF communication interface configured to receive an uplink signal from a UE in a first cell, where two or more other cells are in a coordinated multipoint (CoMP) group with the first cell. Further, the network component may include program instructions stored in data storage 206, which are executable by processor 204 to provide the functionality of network components described herein, including but not limited to the methods described in FIGS. 3A, 3B, and 4.

VI. EXEMPLARY METHODS

Figure 3A:
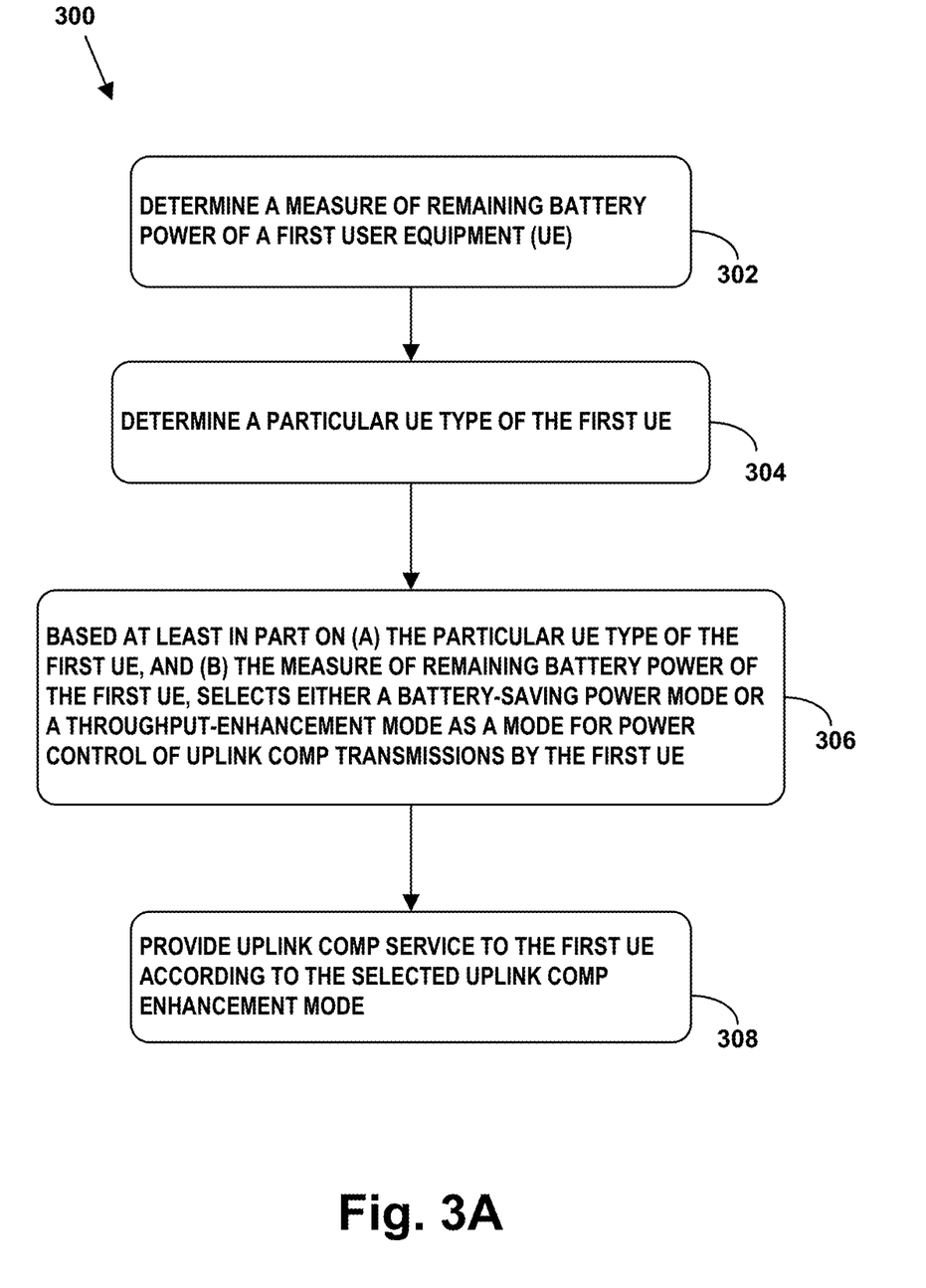
FIG. 3A is flow chart illustrating a method, according to an exemplary embodiment.

FIG. 3A is flow chart illustrating a method 300, according to an exemplary embodiment. Method 300 may be implemented by a base station (e.g., an eNodeB). Of course, it should be understood that method 300 or portions thereof may be implemented by other entities or combinations of entities, and/or may be implemented for other purposes, without departing from the scope of the invention.

As shown by block 302, method 300 involves an eNodeB determining a measure of remaining battery power of a first UE, which is capable of uplink CoMP. The eNodeB also determines a particular UE type of the first UE, where the particular UE type is one of a plurality of possible UE types, as shown by block 304. Then, based at least in part on (a) the particular UE type of the first UE, and (b) the measure of remaining battery power of the first UE, the eNodeB selects either a battery-saving mode or a throughput-enhancement mode as a mode for power control of uplink CoMP transmissions by the first UE, as shown by block 306. The eNodeB then sends an indication that the first UE should engage in uplink communication according to the selected mode, as shown by block 308.

A. Determining a Measure of Remaining Battery Power

At block 302, a base station may determine the remaining battery power of a UE in various ways. In some embodiments, an eNodeB may receive a message from the UE, which indicates the UE's remaining battery power. Such a message be sent periodically by the UE, or an ad hoc basis. Further, in some cases, the eNodeB may request that the UE send an indication of its remaining battery power on an as-needed basis. Alternatively, the UE may send a message indicating its remaining battery power to another network entity, and the eNodeB carrying out method 300 may receive the indication from the other network entity.

The UE may send the indication of remaining battery power to an eNodeB in any appropriate message. In some cases, the indication of remaining battery power may be added to a message that is already being sent in accordance with an LTE implementation (but has not traditionally included an indication of remaining battery power). In other cases, an LTE implementation could be modified, such that a UE can send a message specifically to report it remaining battery power.

In a further aspect, the indication of a UE's remaining battery power may take various forms. For example, the remaining battery power could be represented as: (a) a percentage of total battery capacity remaining, (b) an estimate of the amount of time for which the remaining battery power is expected to power the UE, and/or (c) a quantitative measure of remaining battery power (e.g., in milliampere hours (mAh)), among other possibilities.

B. Determining a UE Type

As noted, block 304 involves an eNodeB determining a particular UE type of a UE that is capable of uplink CoMP. In an exemplary embodiment, the eNodeB could simply determine whether or not the first UE is a high-power UE (HPUE). Somewhat more granularly, block 304 could be implemented by determining whether the UE classified in power class 3 (e.g., as an HPUE), or in power class 1 (e.g., as a standard UE).

More generally, at block 304 UE type could be determined according to the maximum transmission power with which a given UE is allowed to transmit. Thus, if three or more power classes are defined for UEs engaging in LTE communications (or communications under another protocol), which specify three or more different maximum transmission power levels, block 304 could involve determining the specific power class associated with the particular UE. Other techniques for determining the particular UE type of a UE are also possible.

C. Selecting an Enhancement Mode

As noted, block 306 may involve an eNodeB selecting an enhancement for uplink CoMP. In particular, the eNodeB selects between a battery-saving mode and a throughput-enhancement mode for use by a UE, while the UE is utilizing uplink CoMP for its uplink communications. Further, the selection at block 306 is based on (i) the particular UE type of the first UE, and/or (ii) the measure of remaining battery power of the first UE.

Figure 3B:
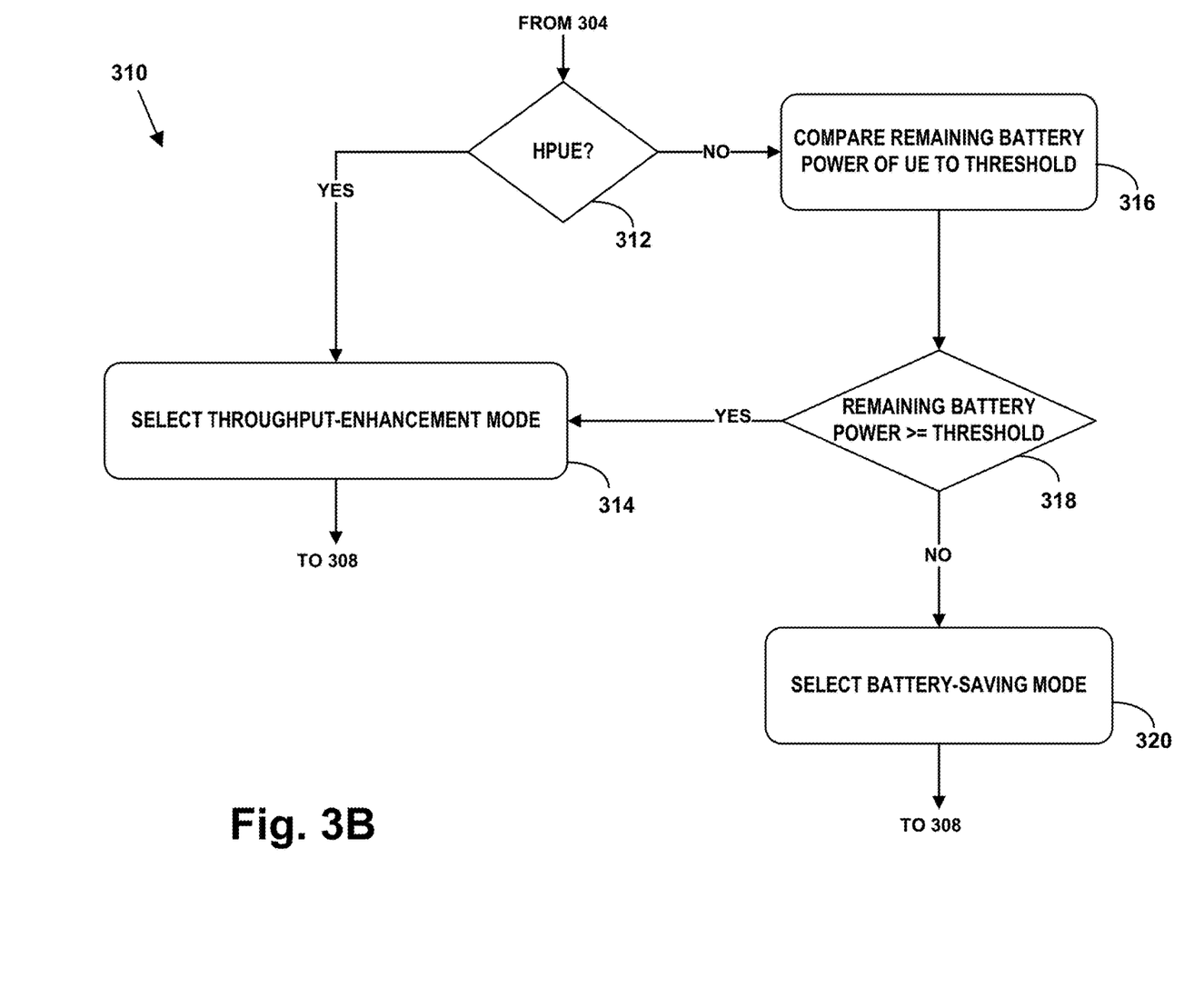
FIG. 3B is a flow chart illustrating a sub-routine of an exemplary method.

For instance, FIG. 3B illustrates a sub-routine 310, which can be performed at block 306 of method 300. More specifically, at block 312, the eNodeB determines whether or not the UE is classified as an HPUE. If the UE is determined to be an HPUE, then the eNodeB selects the throughput-enhancement mode as the enhancement mode for the first UE, as shown by block 314. The eNodeB can then continue on with block 308 of method 300, and instruct the UE to use the throughput-enhancement mode to control the power used for its uplink CoMP transmissions.

On the other hand, if the UE is not determined to be an HPUE (or if the UE is instead determined to be a standard UE), then the eNodeB may continue to block 316 of sub-routine 310, where the eNodeB compares the remaining battery power of the UE to a predetermined threshold level. If the comparison indicates that the UE's remaining battery power is greater than or equal to the predetermined threshold, then the eNodeB again selects the throughput-enhancement mode, at block 314. Otherwise, if the comparison indicates that the UE's remaining battery power is less than the predetermined threshold, then the eNodeB selects a battery-saving mode, as shown by block 320. The eNodeB can then continue on with block 308 of method 300, and instruct the UE to use whichever enhancement mode was selected (either the throughput-enhancement mode or the battery-saving mode) to control the transmit power of UE's uplink CoMP transmissions.

Note that in example shown by sub-routine 310, an HPUE that is capable of uplink CoMP, will always be instructed to use the throughput-enhancement mode. Thus, sub-routine 310 may take into account various considerations relevant to an HPUE, which can favor using the throughput-enhancement mode for uplink CoMP, regardless of the HPUE's remaining battery power. In the case of public safety communications, for instance, it may be desirable to favor increased throughput and/or improved quality service, due to the high importance of such communications, and/or due to the expectation that such communications originate from systems that are typically connected to an external power source and/or occur infrequently, such that battery power of the transmitting device is not of particular concern. In other cases, such as a tablet computer that is designated as an HPUE when plugged in to an external power source, battery power is not of particular concern. Thus, as long as the tablet is plugged in and remains classified as an HPUE, the throughput enhancement mode may be selected.

Further, since the throughput-enhancement mode is always selected for HPUEs in sub-routine 310, an eNodeB may be able to perform method 300 without knowledge of an HPUEs remaining battery power. Accordingly, in some embodiments, the eNodeB may wait to determine a UE's remaining battery power (e.g., by waiting to perform block 304), until after it has determined that a UE is not an HPUE. And, the eNodeB may not perform block 304 in cases where it determines that the UE is an HPUE. In other words, block 304 may be performed after it is determined that the UE is not classified as an HPUE (e.g., after block 312 results in such a determination), and before the comparison made at block 316.

In another aspect, variations on sub-routine 310, where the selection process for non-HPUEs takes other factors into account, are also possible. In such embodiments, scenarios may exist where consideration of such other factors results in an eNodeB selecting the battery-saving mode for a non-HPUE, even though the non-HPUE's remaining battery power is above the threshold level, and/or selecting the throughput-enhancement mode for a non-HPUE even though the non-HPUE's remaining battery power is below the threshold level. For example, an eNodeB may consider traffic levels and/or available bandwidth in cells from the UE's cooperating set, in combination with the UE's remaining battery power, when selecting the uplink transmission mode for a UE not classified as an HPUE. In view of potential interference issues in high-traffic coverage areas, the eNodeB may be more likely to select the throughput-enhancement mode when traffic levels in cells from a UE's uplink CoMP coordinating set are lower, and vice versa. Thus, in a scenario where the traffic level(s) in one or more cell from the UE's cooperating set is/are above a predetermined threshold traffic level, the battery-saving mode may be selected, regardless of whether the UE's remaining battery power is above the threshold battery level. Other examples are of course possible.

Furthermore, it should be understood that sub-routine 310 is provided as an example, and is not intended to be limiting. Other techniques for selecting between the battery-saving mode and the throughput-enhancement mode for a UE, and variations on the techniques described herein, are also possible.

D. Providing Uplink CoMP According to the Selected Enhancement Mode

At block 308, uplink CoMP may be provided to the UE according to the particular enhancement mode selected at block 306. In an exemplary embodiment, the selected CoMP enhancement mode may be provided to a given UE by selecting, from a number of possible MCSs, an MCS that corresponds to the particular enhancement mode, such that the given UE engages in uplink communication according to the corresponding MCS. Alternatively, the eNodeB could send a message to the UE that explicitly indicates the selected enhancement mode for uplink CoMP, such that the UE will carry out its uplink transmissions accordingly.

E. Conditional Performance of Methods Based on Uplink CoMP Capability

In some embodiments, an exemplary method for selection of an uplink CoMP enhancement mode (e.g., between a battery-saving mode and a throughput-enhancement mode) may be conditioned upon an initial determination that a UE is capable of uplink CoMP. More specifically, an eNodeB may initially determine whether or not a UE is capable of uplink CoMP, and condition the performance of method 300 (and sub-routine 310) upon an initial determination that the UE is in fact capable of uplink CoMP.

Figure 4:
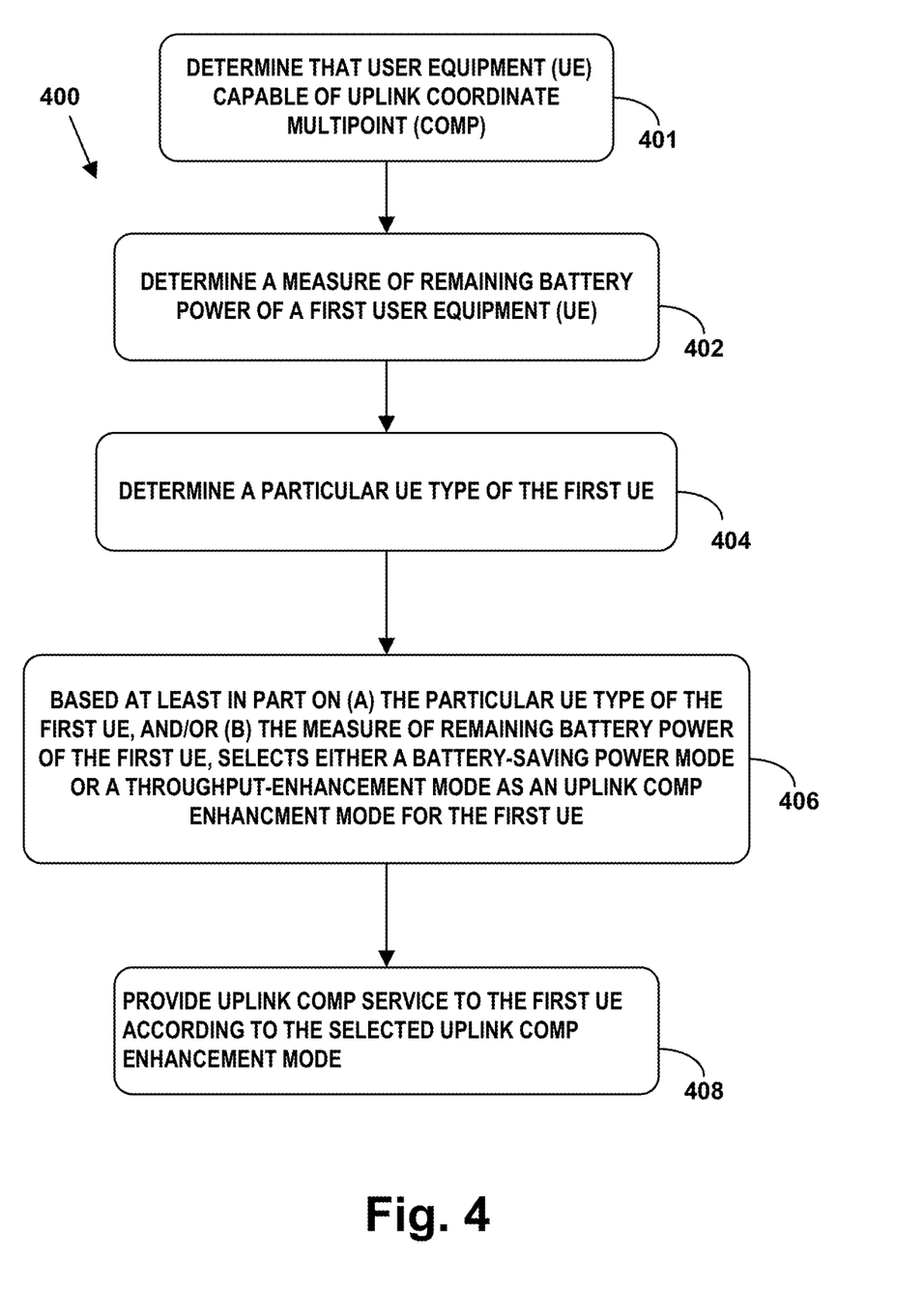
FIG. 4 is a flow chart illustrating a method in accordance with an exemplary embodiment, in which selection of an uplink coordinated multipoint enhancement mode is conditioned upon a user equipment being capable of uplink coordinated multipoint.

For example, FIG. 4 is a flow chart illustrating an exemplary method 400, where the process for selecting an enhancement mode is conditioned upon a UE being capable of uplink CoMP. Method 400 begins in scenario where the eNodeB has determined that a UE is, in fact capable of uplink CoMP, as shown by block 401. In this scenario, where the UE is capable of uplink CoMP, the eNodeB continues to perform blocks 402 to 408. Blocks 402 to 408 may be implemented in the same or a similar manner to blocks 302 to 308 of method 300, respectively.

In a further aspect, various techniques may be used to determine that a particular UE is capable of uplink CoMP. In some cases, the eNodeB may determine whether the UE is capable of CoMP in its current situation (e.g., at the UE's current location and/or with the UE's current operating parameters). For instance, to reach the decision made at block 401 (or the alternate conclusion that a UE is not capable of CoMP), an eNodeB may evaluate whether or not the UE's PUSCH transmissions are received in more than one cell in a cooperating set (and perhaps require reception at some minimum level). As such, the eNodeB may determine that a UE is capable of uplink CoMP when the uplink signal from the UE is jointly received (i.e., in the same frame) in two or more cells in a CoMP cooperating set. In practice, this could involve the eNodeB determining that a UE's PUSCH transmissions have been received jointly in multiple cells, such that the signals can combined (e.g., using IRC) in effort to improve the received signal quality.

In other cases, the eNodeB might evaluate whether a given UE is capable of CoMP by determining whether or not the given UE is configured for CoMP (e.g., whether or not the UE has the appropriate software, hardware, and/or firmware for CoMP), and/or whether eNodeBs near to a UE are configured to provide uplink CoMP (e.g., whether or not the eNodeB(s) near the UE have the appropriate software, hardware, firmware, and/or backhaul links to provide uplink CoMP). Other techniques for determining whether a UE is capable of uplink CoMP are also possible.

VII. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   determining a measure of remaining battery power of a first user equipment (UE), wherein the first UE is capable of uplink coordinated multipoint (CoMP) communication via a radio access network;
   determining a particular UE type of the first UE, wherein the particular UE type is one of a plurality of possible UE types;
   based at least in part on (a) the particular UE type of the first UE, and (b) the measure of remaining battery power of the first UE, selecting either a battery-saving mode or a throughput-enhancement mode as an uplink CoMP enhancement mode for the first UE; and
   providing uplink CoMP service to the first UE according to the selected uplink CoMP enhancement mode.

2. The method of claim 1, wherein the method is carried out by an eNodeB in a radio access network.

3. The method of claim 2, wherein the eNodeB provides in a serving cell from an uplink CoMP cooperating set for the first UE.

4. The method of claim 1, wherein the measure of the remaining battery power of the first UE comprises a percentage of a maximum power, an estimated remaining time of operation, or both.

5. The method of claim 1, wherein determining the particular UE type of the first UE comprises determining whether or not the first UE is a high-power UE (HPUE).

6. The method of claim 5, wherein selecting the enhancement mode to control uplink transmissions by the first UE comprises:
   if the first UE is determined to be an HPUE, then selecting a throughput-enhancement mode as the enhancement mode for the first UE; and
   if the first UE is not an HPUE, then using the measure of the remaining battery power of the first UE as a basis for selecting the enhancement mode.

7. The method of claim 5, wherein selecting the enhancement mode to control uplink transmissions by the first UE comprises:

if the first UE is determined to be an HPUE, then selecting a throughput-enhancement mode as the enhancement mode for the first UE; and if the first UE is not an HPUE, then:
- comparing the measure of the remaining battery power to a predetermined threshold;
- if the comparison indicates that the remaining battery power of the first UE is less than the predetermined threshold, then selecting the battery-saving mode as the uplink CoMP enhancement mode for the first UE; and
- otherwise, if the comparison indicates that the remaining battery power of the first UE is greater than or equal to the predetermined threshold, then selecting the throughput-enhancement mode as the uplink CoMP enhancement mode for the first UE.

8. The method of claim 1, wherein selection of the throughput-enhancement mode comprises selection, from a plurality of possible modulation and coding scheme (MCS), a particular MCS corresponding to the throughput-enhancement mode.

9. A method comprising:
determining whether a first user equipment (UE) is of a first UE type or a second UE type;
when the first UE is determined to be of the first UE type, selecting a throughput-enhancement mode as an uplink coordinated multipoint (CoMP) enhancement mode for the first UE; and
when the first UE is not determined to be of the first UE type, then:
(a) determining a measure of remaining battery power of the first UE;
(b) comparing the measure of the remaining battery power to a predetermined threshold;
(c) when the comparison indicates that the remaining battery power of the first UE is less than the predetermined threshold, selecting a battery-saving mode as the uplink CoMP enhancement mode for the first UE; and
(d) when the comparison indicates that the remaining battery power of the first UE is greater than or equal to the predetermined threshold, then selecting the throughput-enhancement mode as the uplink CoMP enhancement mode for the first UE.

10. The method of claim 9, further comprising:
initially determining that the first UE is capable of uplink CoMP communication via a radio access network; and
in response to determining that the first UE is capable of uplink CoMP, the radio access network, performing the method of claim 9.

11. The method of claim 10, wherein determining that the first UE is capable of uplink CoMP comprises determining that the UE is configured to transmit uplink communications in accordance with an uplink CoMP scheme.

12. The method of claim 10, wherein determining that the first UE is capable of uplink CoMP comprises determining that an uplink signal from the UE has been jointly received in two or more cells.

13. The method of claim 12, wherein the two or more cells are part of an uplink CoMP cooperating set for the first UE.

14. The method of claim 9, wherein the first UE type is a high-power UE (HPUE), and the second UE type is a UE type other than an HPUE.

15. A system comprising:
a communication interface operable for cellular communications with at least one user equipment (UE);
at least one processor; and
program instructions stored in a non-transitory computer readable medium and executable by at least one processor to:
(a) determine a measure of remaining battery power of a first UE, wherein the first UE is capable of uplink coordinated multipoint (CoMP) communication via the radio access network;
(b) determine a particular UE type of the first UE, wherein the particular UE type is one of a plurality of possible UE types;
(c) based at least in part on (i) the particular UE type of the first UE, and (ii) the measure of remaining battery power of the first UE, select either a battery-saving mode or a throughput-enhancement mode as an uplink CoMP enhancement mode for the first UE; and
(d) provide uplink CoMP service to the first UE according to the selected uplink CoMP enhancement mode.

16. The system of claim 15, wherein the system is implemented within or takes the form of an eNodeB in an LTE network, and wherein the eNodeB provides coverage in a serving cell that is part of an uplink CoMP cooperating set for the first UE.

17. The system of claim 15, wherein the measure of the remaining battery power of the first UE comprises a percentage of a maximum power, an estimated remaining time of operation, or both.

18. The system of claim 15, wherein the program instructions executable to determine the particular UE type of the first UE comprise program instructions executable to determine whether or not the first UE is a high-power UE (HPUE).

19. The system of claim 18, wherein the program instructions executable to select the enhancement mode to control uplink transmissions by the first UE comprise program instructions executable to:
if the first UE is determined to be an HPUE, then select a throughput-enhancement mode as the enhancement mode for the first UE; and
if the first UE is not an HPUE, then use the measure of the remaining battery power of the first UE as a basis to select the enhancement mode.

20. The system of claim 15, wherein the program instructions executable to select the enhancement mode to control uplink transmissions by the first UE comprise program instructions executable to:
if the first UE is determined to be an HPUE, then select a throughput-enhancement mode as the enhancement mode for the first UE; and
if the first UE is not an HPUE, then:
- compare the measure of the remaining battery power to a predetermined threshold;
- if the comparison indicates that the remaining battery power of the first UE is less than the predetermined threshold, then select the battery-saving mode as the uplink CoMP enhancement mode for the first UE; and
- otherwise, if the comparison indicates that the remaining battery power of the first UE is greater than or equal to the predetermined threshold, then select the throughput-enhancement mode as the uplink CoMP enhancement mode for the first UE.

* * * * *